United States Patent
Yamashita (10) Patent No.: US 12,118,417 B2
(45) Date of Patent: Oct. 15, 2024

(54) IMAGE FORMING APPARATUS, IMAGE FORMING SYSTEM, AND CONTROL METHOD THAT EXECUTE POST-PROCESSING ON A PLURALITY OF SHEETS

(71) Applicant: Konica Minolta, Inc., Tokyo (JP)

(72) Inventor: Takashi Yamashita, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/355,604

(22) Filed: Jul. 20, 2023

(65) Prior Publication Data
US 2024/0028855 A1 Jan. 25, 2024

(30) Foreign Application Priority Data
Jul. 20, 2022 (JP) .................. 2022-115415

(51) Int. Cl.
*G06K 15/00* (2006.01)
*H04N 1/00* (2006.01)

(52) U.S. Cl.
CPC ....... *G06K 15/403* (2013.01); *H04N 1/00623* (2013.01); *H04N 1/00639* (2013.01); *H04N 1/00482* (2013.01)

(58) Field of Classification Search
CPC ............. G06K 15/403; H04N 1/00623; H04N 1/00639; H04N 1/00482
See application file for complete search history.

(56) References Cited

U.S. PATENT DOCUMENTS

| | | | | |
|---|---|---|---|---|
| 2011/0107432 | A1* | 5/2011 | Oomori | G06F 3/1222 726/27 |
| 2011/0292443 | A1* | 12/2011 | Kamata | H04N 1/32 358/1.15 |
| 2015/0310316 | A1* | 10/2015 | Osada | G06K 15/403 358/1.12 |
| 2016/0011826 | A1* | 1/2016 | Nagata | B65H 7/20 358/1.15 |
| 2016/0094750 | A1* | 3/2016 | Kitahara | H04N 1/00604 358/1.14 |
| 2021/0234979 | A1* | 7/2021 | Watanabe | H04N 1/0057 |
| 2022/0269914 | A1* | 8/2022 | Tanaka | G06K 15/1852 |

FOREIGN PATENT DOCUMENTS

JP 2018-084945 A 5/2018

* cited by examiner

*Primary Examiner* — Nicholas Pachol
(74) *Attorney, Agent, or Firm* — Osha Bergman Watanabe & Burton LLP (57) ABSTRACT

An image forming apparatus connected to a first post-processing machine that executes first post-processing on at least one of a plurality of sheets includes: an image forming device that forms an image on each of the sheet; and a controller that instructs, in response to an output of a target sheet that satisfies a specific condition from the image forming section, the first post-processing machine to execute the first post-processing on the target sheet and a stacked sheet among the sheets.

10 Claims, 11 Drawing Sheets

IMAGE FORMING APPARATUS, IMAGE FORMING SYSTEM, AND CONTROL METHOD THAT EXECUTE POST-PROCESSING ON A PLURALITY OF SHEETS

CROSS-REFERENCE TO RELATED APPLICATIONS

The entire disclosure of Japanese Patent Application No. 2022-115415, filed on Jul. 20, 2022, is incorporated herein by reference.

BACKGROUND

Technical Field

The present disclosure relates to an image forming apparatus, an image forming system, and a control method.

Description of Related Art

Conventionally, a post-processing machine which executes post-processing on a plurality of sheets output from an image forming apparatus has been known. For example, Japanese Laid-Open Patent Publication No. 2018-84945 discloses a stacking-type cutting machine that cuts a plurality of stacked sheets.

The post-processing on a plurality of sheets is usually executed for each job. Alternatively, in a case where the number of sheets included in one job is large, the post-processing is executed on each sheet of the number of sheets determined according to the specifications of the post-processing machine (for example, in the case of the stacking-type cutting machine described in Japanese Laid-Open Patent Publication No. 2018-84945, the cuttable stacking amount).

However, a user desires to collectively execute post-processing on a plurality of sheets output in accordance with a plurality of jobs. Alternatively, a user desires to execute post-processing on a desired number of sheets out of a large number of sheets output in accordance with one job. The conventional technology cannot respond to these demands.

SUMMARY

The present disclosure has been made in consideration of the above-described background, and one or more embodiments provide an image forming apparatus, an image forming system, and a control method that can execute post-processing on a plurality of sheets at any timing.

According to an aspect of the present invention, an image forming apparatus is connected to a first post-processing machine that executes first post-processing on at least one of a plurality of sheets, the image forming apparatus comprising: an image forming section (i.e., image forming device) that forms an image on each of the sheets; and a controller. In response to an output of a target sheet that satisfies a specific condition from the image forming section, the controller instructs the first post-processing machine to execute the first post-processing on the target sheet and a stacked sheet among the sheets.

In one or more embodiments, the image forming apparatus further comprises a sheet feeder that comprises a plurality of sheet feed trays, wherein the specific condition is that the target sheet is fed from a predetermined sheet feed tray among the sheet feed trays.

In one or more embodiments, the specific condition includes at least one of: that the target sheet is a predetermined type sheet, that the target sheet has a predetermined size, and that the target sheet has a predetermined basis weight.

In one or more embodiments, the controller receives, for each job, a setting as to whether to execute the first post-processing. The specific condition is that the target sheet is supplied for a job for which the first post-processing is set to be executed.

In one or more embodiments, the controller receives, for each job, a setting as to whether to execute the first post-processing, and receives, for a job for which the first post-processing is set to be executed, a setting of a designated page on which the first post-processing is to be executed. The specific condition is that the target sheet is supplied for the designated page of the job for which the first post-processing is set to be executed.

In one or more embodiments, the controller receives, for each job, a setting as to whether the job is a target for the first post-processing, and for the job that is the target for the first post-processing, instructs the first post-processing machine to stack a sheet that does not satisfy the specific condition among the sheets.

In one or more embodiments, in response to receiving a job to output the target sheet and a sheet that does not satisfy the specific condition among the sheets, the controller instructs the first post-processing machine to stack the sheet that does not satisfy the specific condition.

In one or more embodiments, the image forming apparatus further comprises: a second post-processing machine that is disposed between the image forming apparatus and the first post-processing machine and executes second post-processing on a sheet output from the image forming section. The controller receives a job that has: a first task including execution of the second post-processing. and a second task including execution of the first post-processing. The specific condition is that an image of a final page of the second task is formed on the target sheet. The controller instructs the first post-processing machine to stack, among the sheets: a sheet that is a result of the first task, and a sheet other than the target sheet on which the image of the final page is formed in the second task.

In one or more embodiments, the job further includes a third task that does not include the execution of the first post-processing and the second post-processing. The controller instructs the first post-processing machine to stack, among the sheets, a sheet that is a result of the third task.

According to an aspect of the present invention, an image forming system comprises: an image forming section (i.e., image forming device) that forms an image on each of a plurality of sheets; a post-processing machine that executes post-processing on at least one of the sheets output from the image forming section; and a controller that instructs, in response to an output of a target sheet that satisfies a specific condition from the image forming section, the post-processing machine to execute first post-processing on the target sheet and a stacked sheet among the sheets.

According to an aspect of the present invention, a method of controlling an image forming system comprises a first step and a second step. The image forming system includes an image forming section (i.e., image forming device) that forms an image on each of a plurality of sheets, and a post-processing machine that executes post-processing on at least one of the sheets output from the image forming section. The first step is determining whether the one of the sheets output from the image forming section is a target sheet that satisfies a specific condition. The second step is instructing, in response to an output of the target sheet from the image forming section, the post-processing machine to execute post-processing on the target sheet and a stacked sheet among the sheets.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

Hereinafter, embodiments and modification examples according to the present disclosure will be described with reference to the drawings. In the following description, the same parts and constituent elements are denoted by the same reference numerals. The names and functions of the same parts and constituent elements are also the same. Therefore, detailed description of the same parts and constituent elements will not be repeated. It should be noted that the embodiments and modification examples described below may be selectively combined as appropriate.

System Configuration

Figure 1:
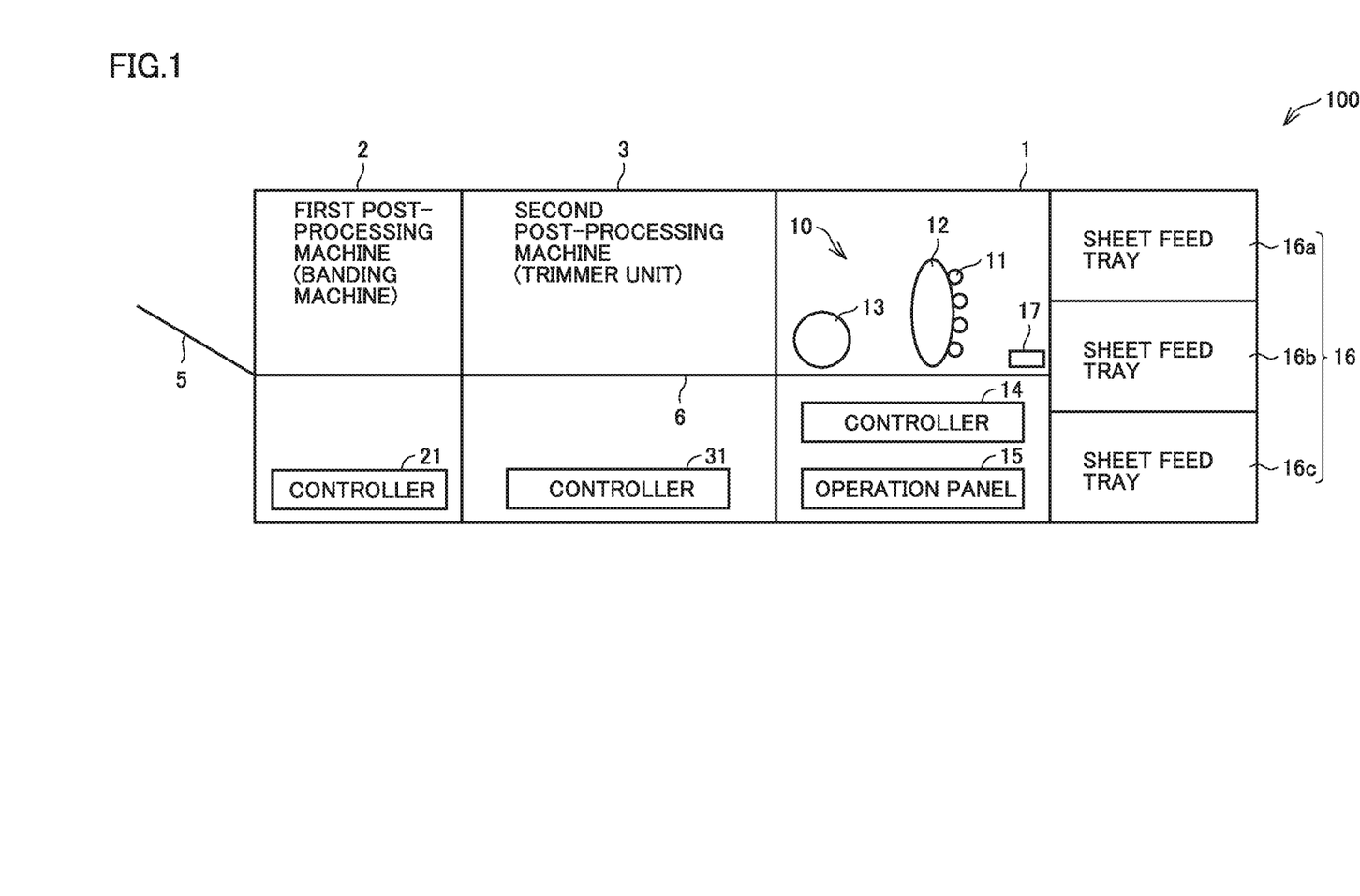
FIG. 1 is a diagram showing an example of a configuration of an image forming system according to one or more embodiments.

FIG. 1 is a diagram showing an example of a configuration of an image forming system according to one or more embodiments. An image forming system 100 includes an image forming apparatus 1, a first post-processing machine 2, and a second post-processing machine 3.

The image forming apparatus 1 executes print processing corresponding to an received print job (hereinafter simply referred to as a "job"). The image forming apparatus 1 includes, for example, a multifunction apparatus and a printer. The image forming apparatus 1 includes an image forming section (i.e., image forming device) 10, a controller 14, an operation panel 15, a sheet feed section (i.e., sheet feeder) 16, and a sensor unit 17.

The sheet feed section 16 supplies a sheet to the image forming section 10. The sheet feed section 16 includes a plurality of sheet feed trays. In the example illustrated in FIG. 1, the sheet feed section 16 includes sheet feed trays 16a to 16c. Sheets having different sheet types, sizes, basis weights, and the like can be stored in the sheet feed trays 16a to 16c.

The sensor unit 17 detects a sheet type, a basis weight, a size, and the like of a sheet supplied from the sheet feed section 16. The sensor unit 17 includes, for example, a basis weight sensor, a surface property sensor, and a thickness sensor. The basis weight sensor detects a basis weight of the sheet. The basis weight of the sheet is measured based on some or all of physical properties of the sheet such as density, air permeability, stiffness, and electrical resistance, for example. The basis weight may be detected by a weight sensor that directly measures the weight of the sheet. The surface property sensor detects a surface property (smoothness or a degree of smoothness) of a sheet. The surface property of the sheet is measured using, for example, a reflection sensor. The reflection sensor outputs intensities and/or an intensity ratio of specular reflection light and scattered reflection light of the light applied to the sheet. The surface property of the sheet is measured based on, for example, an intensity ratio. The thickness sensor detects the thickness of the sheet. The thickness of the sheet is measured by, for example, a displacement sensor that detects a distance between axes of two rollers that are movable in a thickness direction of the sheet.

The image forming section 10 includes a plurality of imaging units 11, an intermediate transfer belt 12, and a fixing device 13.

The plurality of imaging units 11 include, for example, four imaging units 11 that form toner images of cyan (C), magenta (M), yellow (Y), and key plate (K), respectively. Each imaging unit 11 includes, for example, a photoreceptor, a charging section or charger that uniformly charges the surface of the photoreceptor, an exposure section or exposer that exposes the surface of the photoreceptor in accordance with an image pattern, and a developing section or developer that develops an electrostatic latent image formed on the photoreceptor as a toner image.

The toner image formed by the imaging unit 11 is transferred to the intermediate transfer belt 12. Toner images are sequentially transferred from the respective imaging units 11 onto intermediate transfer belt 12, and the toner images in a plurality of colors are superimposed. Intermediate transfer belt 12 transfers the toner images onto a sheet supplied from sheet feed section 16. A sheet to which the toner images have been transferred is transported to the fixing device 13. The fixing device 13 thermally fixes the toner image on the sheet.

The operation panel 15 includes, for example, a touch screen and hard keys. The operation panel 15 displays a screen for prompting a user input and receives a job corresponding to the user input. The job designates an image to be printed, printing conditions, conditions of post-processing by the first post-processing machine 2 and the second post-processing machine 3, and the like. The printing conditions include a sheet feed tray, a color mode, conditions of layout printing (a function of printing a plurality of pages on one sheet), the number of copies to be printed, and the like.

The controller 14 controls the operation of each unit of the image forming apparatus 1 and outputs instructions to the first post-processing machine 2 and the second post-processing machine 3.

The first post-processing machine 2 and the second post-processing machine 3 are connected to the image forming apparatus 1 in order to execute first post-processing and second post-processing, respectively, on a sheet output from the image forming apparatus 1. In the example shown in FIG. 1, the second post-processing machine 3 and the first post-processing machine 2 are connected at stages subsequent to the image forming apparatus 1 in this order. That is, a conveyance path 6 for sheets passes through the image forming apparatus 1, the second post-processing machine 3, and the first post-processing machine 2 in this order. A sheet ejection tray 5 is disposed at an end of the conveyance path 6.

The second post-processing machine 3 is, for example, a trimmer unit that executes sheet cutting processing as the second post-processing. Hereinafter, a case where the second post-processing machine 3 is a trimmer unit will be described. The second post-processing machine 3 has a blade for cutting the sheet along a conveyance direction of the sheet and a blade for cutting the sheet along a direction orthogonal to the conveyance direction of the sheet. The second post-processing machine 3 includes a controller 31. The controller 31 controls the operation of the second post-processing machine 3 in accordance with an instruction from the controller 14.

The first post-processing machine 2 executes the first post-processing on a plurality of sheets. The first post-processing machine 2 is, for example, a banding machine that executes banding processing on a plurality of sheets as the first post-processing. Hereinafter, a case where the first post-processing machine 2 is a banding machine will be described. The first post-processing machine 2 includes a controller 21. The controller 21 controls the operation of the first post-processing machine 2 in accordance with an instruction from the controller 14.

Hardware Configuration of Controller

Figure 2:
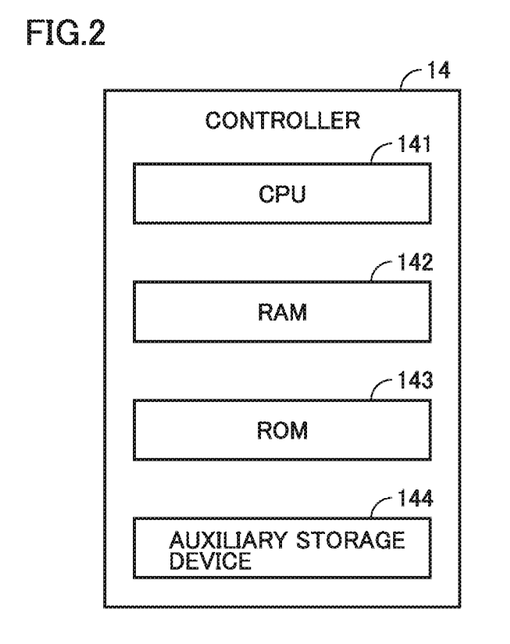
FIG. 2 is a diagram illustrating an example of a hardware configuration of a controller included in the image forming apparatus.

FIG. 2 is a diagram illustrating an example of a hardware configuration of the controller included in the image forming apparatus. As illustrated in FIG. 2, the controller 14 includes a central processing unit (CPU) 141 that is an example of a hardware processor, a random access memory (RAM) 142, a read only memory (ROM) 143, and an auxiliary storage device 144.

CPU 141 executes a program or instructions for controlling the operation of image forming apparatus 1. The program or instructions executed by the CPU 141 include, for example, programs for displaying a screen on the operation panel 15, generating a job in response to an input to the operation panel 15, forming an image on a sheet, and executing image processing. In one or more embodiments, the program or instructions is stored in the auxiliary storage device 144. In one or more embodiments, the CPU 141 may download the program or instructions from an external device via a network.

The RAM 142 temporarily stores the program or instructions to be executed by the CPU 141 and data to be referred to by the CPU 141. In one or more embodiments, the RAM 142 may be a static random access memory (SRAM), a dynamic random access memory (DRAM), or the like.

The ROM 143 stores therein programs such as an operating system (OS) to be executed by the CPU 141. In one or more embodiments, ROM 143 may be an erasable programmable ROM (EPROM), an electrically erasable programmable ROM (EEPROM), a flash memory, or the like.

The auxiliary storage device 144 is constituted of a non-volatile memory such as a hard disk drive (HDD), and stores various programs or instructions and various kinds of information relating to the image forming apparatus 1.

In one or more embodiments, the controller 14 may be constituted of a circuit element such as at least one embedded CPU, at least one application specific integrated circuit (ASIC), or at least one field programmable gate array (FPGA). In one or more embodiments, the controller 14 may be constituted of a combination of two or more circuit elements.

The controller 21 included in the first post-processing machine 2 and the controller 31 included in the second post-processing machine 3 also have the same hardware configuration as the controller 14.

Processing of Controller of Image Forming Apparatus

The controller 14 of the image forming apparatus 1 presets a specific condition for determining an execution timing of the first post-processing by the first post-processing machine 2. The specific condition is, for example, a condition that a sheet is fed from a predetermined sheet feed tray of a plurality of sheet feed trays. However, the specific condition is not limited to the above condition, and may be another condition as described later.

Figure 3:
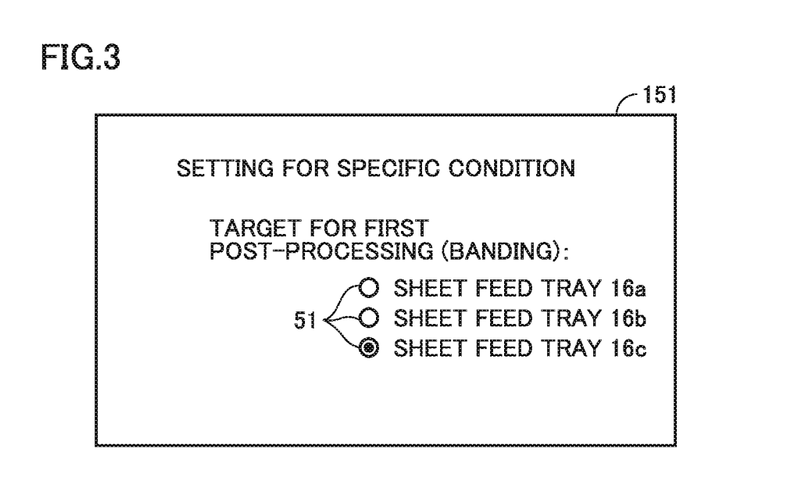
FIG. 3 illustrates an example of a setting screen for setting a specific condition.

FIG. 3 illustrates an example of a setting screen for setting the specific condition. The setting screen 151 is generated by the controller 14 and is displayed on the operation panel 15. The setting screen 151 includes radio buttons 51 for selecting one of the sheet feed trays 16a to 16c. The controller 14 sets the specific condition in response to an operation on a radio button 51. In the case of the setting screen 151 shown in FIG. 3, the controller 14 sets a condition that the sheet is fed from the sheet feed tray 16c as the specific condition. The controller 14 of the image forming apparatus 1 receives a job in response to an input to the operation panel 15. The controller 14 receives, for each job, a setting as to whether the job is a target for the first post-processing by the first post-processing machine 2.

Figure 4:
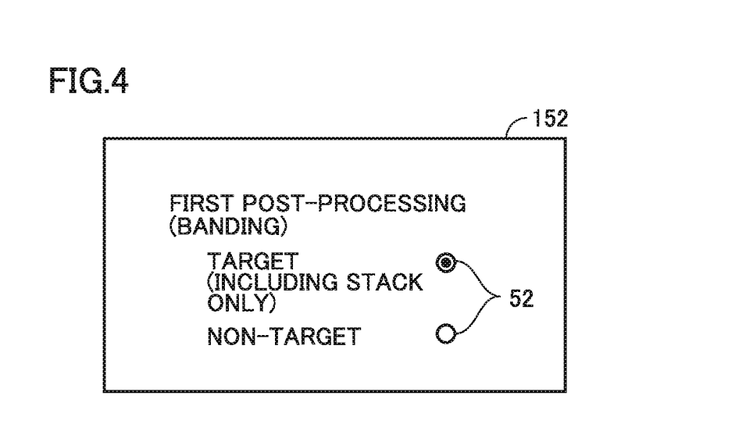
FIG. 4 is a diagram illustrating an example of a setting screen which is displayed when a job is received.

FIG. 4 is a diagram illustrating an example of a setting screen which is displayed when a job is received. The setting screen 152 is generated by the controller 14 and is displayed on the operation panel 15. The setting screen 152 includes radio buttons 52 for selecting a target and a non-target for the first post-processing. The controller 14 adds a flag to a job in response to an operation on the radio button 52. The flag indicates whether the job is a target for the first post-processing.

Figure 5:
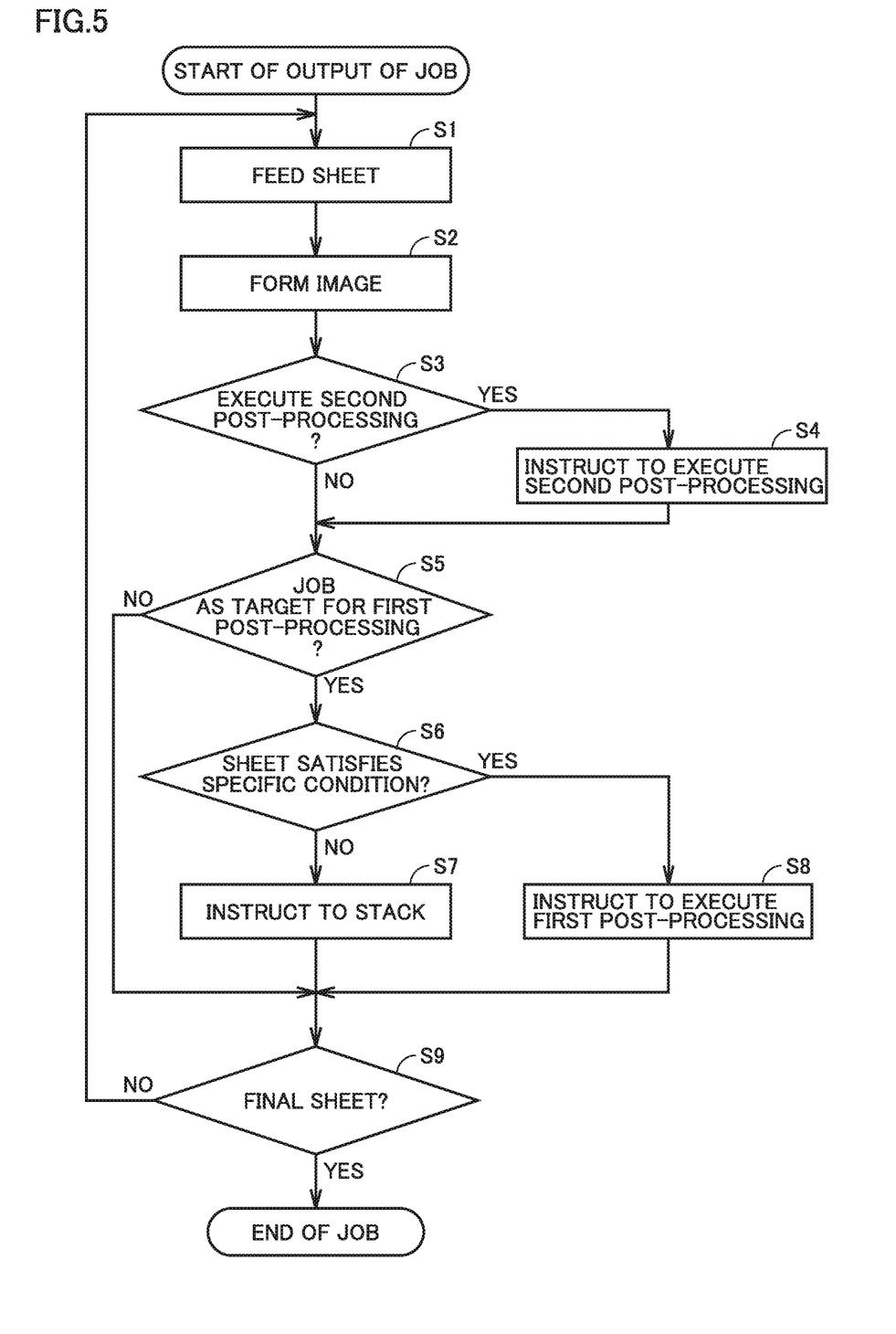
FIG. 5 is a flowchart illustrating a flow of processing of a controller of the image forming apparatus.

FIG. 5 is a flowchart illustrating a flow of processing of a controller of the image forming apparatus. The processing illustrated in FIG. 5 is executed for each received job.

First, the controller 14 controls the sheet feed section 16 to feed a sheet from a sheet feed tray specified by the job (step S1). The controller 14 controls the image forming section 10 to form an image on the fed sheet (step S2).

Next, the controller 14 confirms the content of the job and determines whether to execute the second post-processing (step S3). When the second post-processing is to be executed (YES in step S3), the controller 14 outputs an execution instruction for the second post-processing to the second post-processing machine 3 (step S4). The execution instruction includes the condition of the second post-processing instructed by the job. Accordingly, the second post-processing machine 3 executes the second post-processing on the sheet output from the image forming apparatus 1 in accordance with the condition.

When the second post-processing is not executed (NO in step S3), the controller 14 does not output the execution instruction to the second post-processing machine 3. In this case, the second post-processing machine 3 conveys the sheet from the image forming apparatus 1 to the first post-processing machine 2 that is the subsequent stage without executing any processing on the sheet.

After step S4 or in the case of NO in step S3, the controller 14 determines whether the job is a target for the first post-processing (step S5). As described above, when the job is received, a flag indicating whether the job is a target for the first post-processing is added to the job. Therefore, the controller 14 may execute step S5 based on the flag added to the job.

When the job is not a target for the first post-processing (NO in step S5), the controller 14 does not output an instruction to the first post-processing machine 2. In this case, the first post-processing machine 2 outputs the sheet received from the second post-processing machine 3 to the sheet ejection tray 5 without executing any processing on the sheet.

When the job is a target for the first post-processing (YES in step S5), the controller 14 determines whether the sheet on which the image has been formed in step S2 satisfies a specific condition (step S6). For example, in a case where the specific condition is set in advance by the setting screen 151 shown in FIG. 3, the controller 14 determines that the sheet satisfies the specific condition when the sheet is supplied from the sheet feed tray 16c, and determines that the sheet does not satisfy the specific condition when the sheet is supplied from the sheet feed tray 16a or 16b. Hereinafter, the sheet that satisfies the specific condition is referred to as a "target sheet".

In a case where the sheet does not satisfy the specific condition (NO in step S6), the controller 14 instructs the first post-processing machine 2 to stack the sheet (step S7). Accordingly, the first post-processing machine 2 stacks the sheet that does not satisfy the specific condition for the job that is a target for the first post-processing. Note that "stack" means that the sheet is stacked without being output to the sheet ejection tray 5.

When the sheet satisfies the specific condition (YES in step S6), the controller 14 instructs the first post-processing machine 2 to execute the first post-processing on the stacked sheet and the target sheet (step S8). Accordingly, the first post-processing machine 2 bands a sheet bundle including the stacked sheet and the target sheet, and outputs the sheet bundle to the sheet ejection tray 5.

After steps S7, S8 or in the case of NO in step S5, the controller 14 determines whether the final sheet has been supplied (step S9). If the final sheet has not been supplied (NO in step S9), the processing returns to step S1. If the final sheet has been supplied (YES in step S9), the processing ends.

First Processing Example

Figure 6:
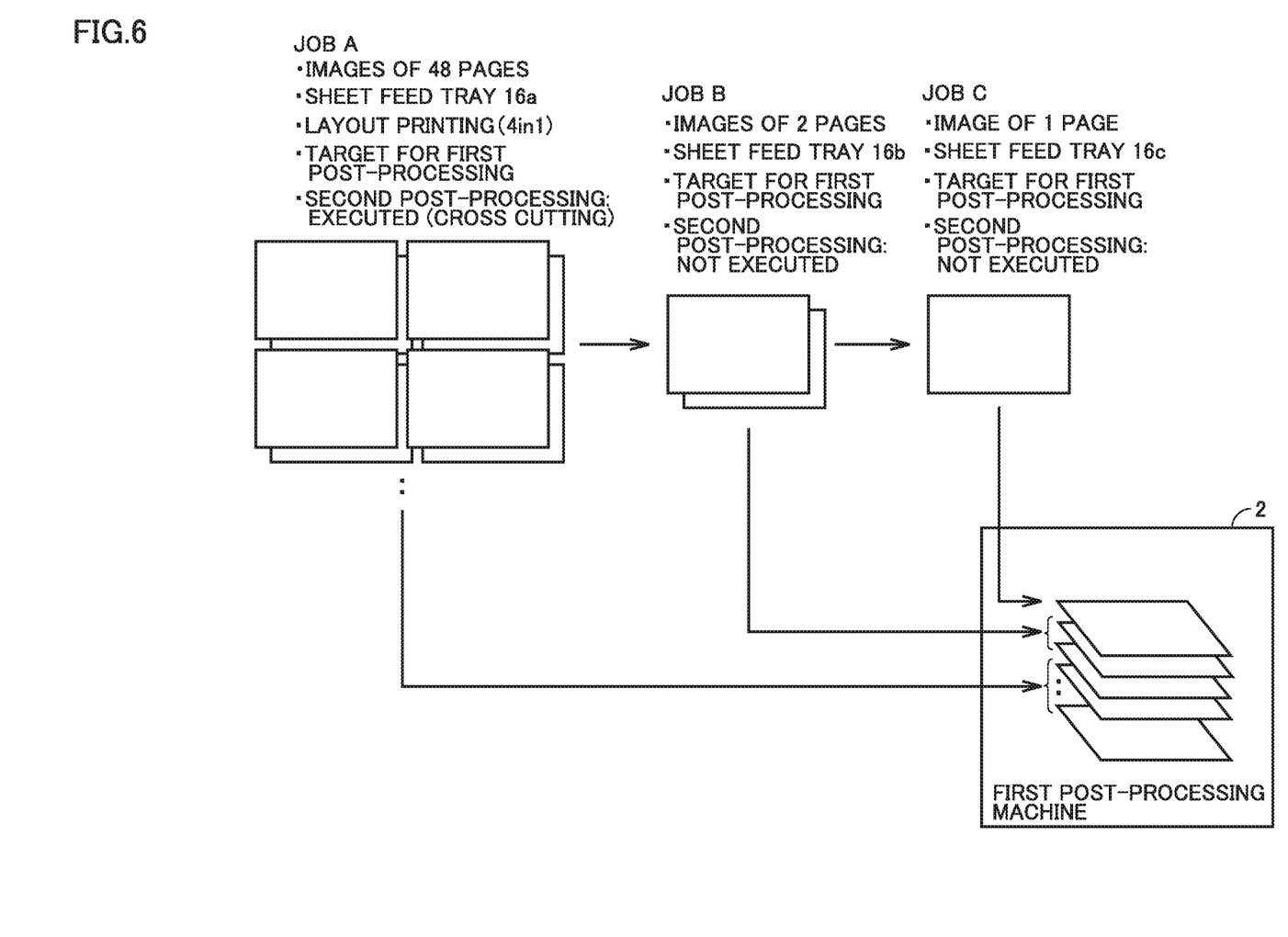
FIG. 6 is a diagram illustrating a first processing example of the image forming system.

A specific first processing example of the image forming system 100 according to one or more embodiments will be described with reference to FIG. 6. FIG. 6 is a diagram illustrating a first processing example of the image forming system. In the first processing example, according to the setting screen 151 in FIG. 3, a condition that a sheet is fed from the sheet feed tray 16c is preset as the specific condition. Sheets of the A3 size are accommodated in the sheet feed tray 16a, sheets of the A5 size are accommodated in the sheet feed tray 16b, and sheets of the A5 size to be each used as a slip sheet are accommodated in the sheet feed tray 16c.

The user desires to band a sheet bundle including 50 printed sheets of A5 size and one slip sheet of A5 size. On 50 printed sheets, images of 50 pages have been printed respectively. The slip sheet is placed on the 50 printed sheets. When the 50 sheets are supplied from the sheet feed tray 16b in order to obtain the 50 printed sheets of the A5 size, processing of the image forming section 10 takes time. On the other hand, images of four pages are collectively formed on a sheet of the A3 size accommodated in the sheet feed tray 16a by using the layout printing function, and the sheet is divided into four by using the second post-processing machine 3, so that the time required for the processing of the image forming section 10 is shortened. Note that 50 pages is not a multiple of 4 pages. Therefore, the user sequentially inputs three jobs and causes them to be executed as follows.

Specifically, the user first inputs a job A and causes the job A to be executed. The job A designates images of 48 pages, sheet feed tray 16a, layout printing (printing for laying out four pages on one sheet), and a condition of the second post-processing (dividing into four in a cross shape (cross cutting)). Next, the user inputs a job B and causes the job B to be executed. The job B designates images of two pages and the sheet feed tray 16b. Finally, the user inputs a job C and causes the job C to be executed. The job C designates an image of one page for slip sheet and sheet feed tray 16c. Furthermore, the user sets each of the jobs A to C as a target for the first post-processing in the setting screen 152 illustrated in FIG. 4.

First, the controller 14 executes steps S1 to S9 illustrated in FIG. 5 for the job A. By the execution of steps S1 to S4, images of four pages are collectively formed on the sheet of the A3 size supplied from the sheet feed tray 16a, and then the sheet is divided into four in a cross shape in the second post-processing machine 3. As a result, four printed sheets of the A5 size are conveyed to the first post-processing machine 2. Since the job A is set as the target for the first post-processing and the sheet output from the image forming section 10 does not satisfy the specific condition, a stacking instruction is output to the first post-processing machine 2 in step S7. As a result, the four printed sheets are stacked in the first post-processing machine 2. The processing of steps S1 to S8 is repeated 12 times, and thus 48 printed sheets are stacked in the first post-processing machine 2.

Next, the controller 14 executes steps S1 to S9 illustrated in FIG. 5 for the job B. By executing steps S1 to S2, an image of one page is formed on the sheet of A5 size supplied from the sheet feed tray 16b. Since the job B does not instruct the second post-processing, the printed sheet passes through the second post-processing machine 3 and is conveyed to the first post-processing machine 2. Since the job B is set as the target for the first post-processing and the sheet output from the image forming section 10 does not satisfy the specific condition, the stacking instruction is output to the first post-processing machine 2 in step S7. As a result, the printed sheet is stacked in the first post-processing machine 2. By repeating the processing of steps S1 to S8 twice, two printed sheets are stacked in the first post-processing machine 2. After the execution of the jobs A and B, 50 printed sheets are stacked in the first post-processing machine 2.

Finally, the controller 14 executes steps S1 to S9 illustrated in FIG. 5 for the job C. By executing steps S1 to S2, an image for slip sheet is formed on a sheet of the A5 size supplied from the sheet feed tray 16c. As a result, a slip sheet is output from the image forming section 10. Since the job C does not instruct the second post-processing, the slip sheet passes through the second post-processing machine 3 and is conveyed to the first post-processing machine 2. Since the job C is set as the target for the first post-processing and the slip sheet output from the image forming section 10 satisfies the specific condition, an execution instruction for the first post-processing is output to the first post-processing machine 2 in step S8. As a result, the slip sheet (target sheet) satisfying the specific condition is stacked on the 50 printed sheets stacked in the first post-processing machine 2, and then the sheet bundle including the 50 printed sheets and the slip sheet is banded. The banded sheet bundle is ejected to the sheet ejection tray 5.

As described above, according to the first processing example, the first post-processing may be executed on a plurality of sheets output in accordance with a plurality of jobs.

Second Processing Example

Figure 7:
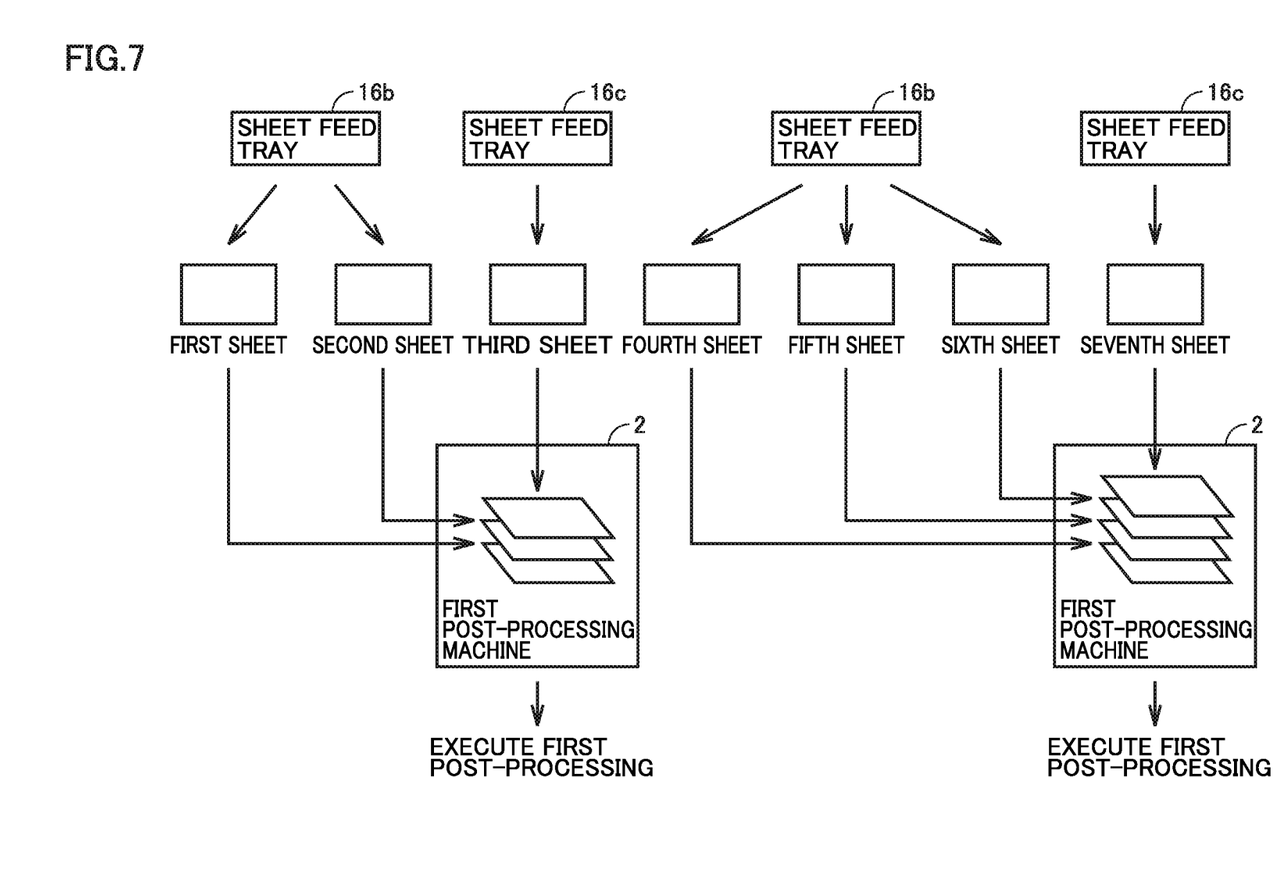
FIG. 7 is a diagram illustrating a second processing example of the image forming system.

With reference to FIG. 7, a specific second processing example of the image forming system 100 according to one or more embodiments will be described. FIG. 7 is a diagram illustrating a second processing example of the image forming system. Also in the second processing example, a condition that a sheet is supplied from the sheet feed tray 16c is set in advance as the specific condition in accordance with the setting screen 151 of FIG. 3. Sheets of the same size are accommodated in the sheet feed trays 16b and 16c. Provided that the sheet feed trays 16b and 16c may store sheets of different sheet types. For example, white sheet is accommodated in the sheet feed tray 16b, and yellow sheet is accommodated in the sheet feed tray 16c.

The user has prepared image data indicating images of a plurality of pages, and inputs one job designating the images of the plurality of pages. The job designates printing of an image of each page on one sheet without using the layout printing function. The user divides images of a plurality of pages into a plurality of subsets. The user desires to band a sheet bundle including a plurality of sheets on which images of subsets are printed. Therefore, the user sets the job so that a sheet on which the final page of each subset is to be printed is supplied from the sheet feed tray 16c. To be specific, the user sets a job so that sheets on which images of the third and seventh pages are to be formed are supplied from the sheet feed tray 16c and the other sheets are supplied from the sheet feed tray 16b. Furthermore, the user sets the job as a target for the first post-processing in the setting screen 152 illustrated in FIG. 4.

The controller 14 executes steps S1 to S9 illustrated in FIG. 5 for the job. By executing steps S1 to S2, the controller 14 forms an image of the first page on a first sheet supplied from the sheet feed tray 16b. Since the job does not instruct the second post-processing, the printed sheet passes through the second post-processing machine 3 and is conveyed to the first post-processing machine 2. Since the job is set as the target for the first post-processing and the first sheet does not satisfy the specific condition, a stacking instruction is output to the first post-processing machine 2 in step S7. As a result, the first printed sheet is stacked in the first post-processing machine 2. A second sheet is also subjected to the same processing as the first sheet, and is stacked in the first post-processing machine 2.

In the next steps S1 and S2, the controller 14 forms an image of the third page on a third sheet fed from the sheet feed tray 16c. Since the job is set as the target for the first post-processing and the third sheet satisfies the specific condition, in step S8, an execution instruction for the first post-processing is output to the first post-processing machine 2. As a result, after the third sheet (target sheet) satisfying the specific condition is stacked on the first and second sheets stacked in the first post-processing machine 2, the sheet bundle including these three sheets is banded. The banded sheet bundle is ejected to the sheet ejection tray 5.

Thereafter, fourth to sixth sheets are supplied from the sheet feed tray 16b, and a seventh sheet is supplied from the sheet feed tray 16c. Therefore, after the fourth to sixth sheets are stacked in the first post-processing machine 2, when the seventh sheet is transported to the first post-processing machine 2, the sheet bundle including the fourth to seventh sheets is banded. The banded sheet bundle is ejected to the sheet ejection tray 5.

Thus, according to the second processing example, the first post-processing can be executed on an arbitrary number of sheets of a large number of sheets to be output in response to one job.

Third Processing Example

A specific third processing example of the image forming system 100 according to one or more embodiments will be described with reference to FIG. 8. In the third processing example, the specific condition is a condition that a sheet is supplied for a job for which the first post-processing is set to be executed.

Figure 8:
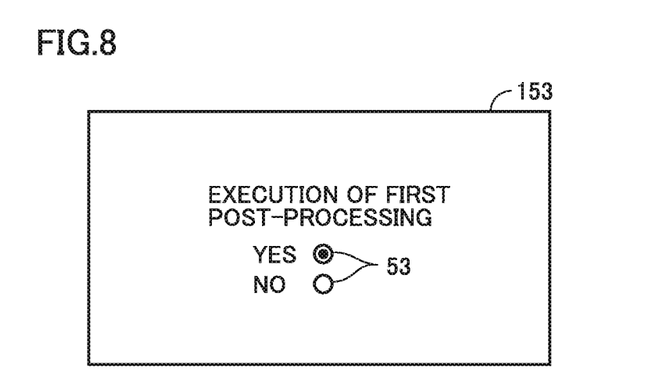
FIG. 8 is a diagram illustrating another example of a setting screen for setting a specific condition.

FIG. 8 is a diagram illustrating another example of a setting screen for setting the specific condition. The setting screen 153 shown in FIG. 8 is generated by the controller 14 and displayed for the job set as a target for the first post-processing in the setting screen 152 shown in FIG. 4.

The setting screen 153 includes radio buttons 53 for selecting whether to execute the first post-processing. The controller 14 sets the specific condition in response to an operation on a radio button 53. The controller 14 sets, as the specific condition, a condition that the sheet is supplied for the job for which the first post-processing is set to be executed.

When the jobs A to C shown in FIG. 6 are input in this order and a condition that a sheet is supplied for the job C is set as the specific condition, the following processing is executed.

That is, similarly to the first processing example, the controller 14 executes steps S1 to S9 illustrated in FIG. 5 for the jobs A and B. As a result, 50 printed sheets are stacked in the first post-processing machine 2.

The controller 14 executes steps S1 to S9 illustrated in FIG. 5 for the job C. By executing steps S1 to S2, an image for slip sheet is formed on a sheet of A5 size supplied from the sheet feed tray 16c. As a result, a slip sheet is output from the image forming section 10. Since the job C is set as the target for the first post-processing and the slip sheet satisfies the specific condition, an execution instruction for the first post-processing is output to the first post-processing machine 2 in step S8. As a result, a sheet bundle including the 50 printed sheets and the slip sheet stacked is banded. The banded sheet bundle is ejected to the sheet ejection tray 5.

Thus, also according to the third processing example, the first post-processing can be executed on a plurality of sheets output in accordance with a plurality of jobs.

Fourth Processing Example

A specific fourth processing example of the image forming system 100 according to one or more embodiments will be described with reference to FIGS. 9 and 10. In the fourth processing example, the specific condition is a condition that a sheet is supplied for a designated page of a job for which the first post-processing is set to be executed.

Figure 9:
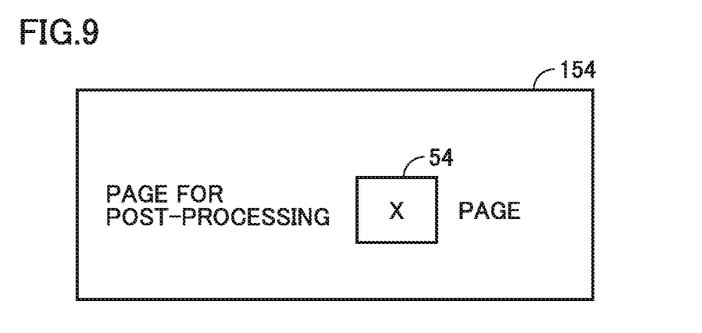
FIG. 9 is a diagram showing an example of a setting screen used for setting a job that is a target for the first post-processing and setting a specific condition.

FIG. 9 is a diagram showing an example of a setting screen used for setting a job that is a target for the first post-processing and setting the specific condition. In the fourth processing example, the controller 14 generates a setting screen 154 illustrated in FIG. 9 instead of FIG. 3, FIG. 4, and FIG. 8, and causes the operation panel 15 to display the setting screen.

The controller 14 causes the operation panel 15 to display the setting screen 154 for each received job. The setting screen 154 includes an input field 54 for inputting a page number for which the first post-processing is to be executed for a corresponding job. In the input field 54, an integer of 0 or more can be input, and a value larger than the number of pages of the image designated by the job may be input. The controller 14 determines whether the corresponding job is a target for the first post-processing in accordance with a value X input to the input field 54. Specifically, when the value X input in the input field 54 is 0, the controller 14 determines the corresponding job as a non-target for the first post-processing, and when the value X input in the input field 54 is 1 or more, the controller 14 determines the corresponding job as a target for the first post-processing. Further, if the value X input to the input field 54 is equal to or greater than 1, the controller 14 sets, as the specific condition, a condition that a sheet is supplied for an X-th designated page of the corresponding job.

Figure 10:
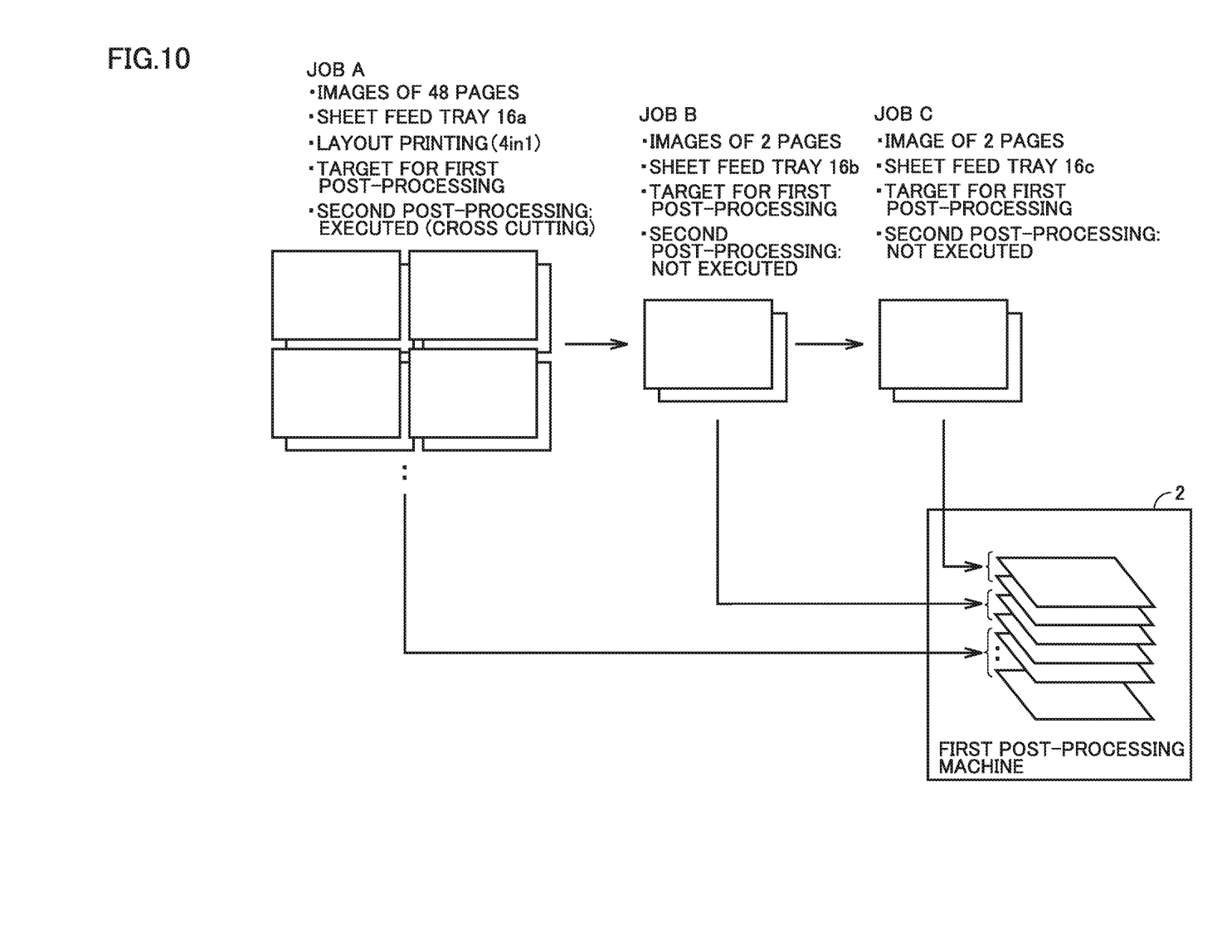
FIG. 10 is a diagram illustrating a fourth processing example of the image forming system.

FIG. 10 is a diagram illustrating a fourth processing example of the image forming system. Also in the fourth processing example, the jobs A to C are sequentially input similarly to the first processing example. However, the fourth processing example illustrated in FIG. 10 is different from the first processing example in that the job C designates images of two pages.

It is assumed that "999" has been input in the input field 54 of the setting screen 154 corresponding to each of jobs A and B and "2" has been input in the input field 54 of the setting screen 154 corresponding to job C. Therefore, the controller 14 determines the jobs A to C as the targets for the first post-processing. Further, the controller 14 sets, as the specific conditions, a condition that a sheet is supplied for the $999^{th}$ designated page of the job A, a condition that a sheet is supplied for the $999^{th}$ designated page of the job B, and a condition that a sheet is supplied for the second designated page of the job C.

Similarly to the first processing example, the controller 14 executes steps S1 to S9 illustrated in FIG. 5 for the jobs A and B.

The job A designates images of 48 pages. Furthermore, a condition that a sheet is supplied for the $999^{th}$ page of job A is set as the specific condition. As a result, in step S6, it is determined that all of the 12 sheets output from the image forming section 10 by the execution of the job A do not satisfy the specific condition. Therefore, after the execution of the job A, the 48 printed sheets are stacked in the first post-processing machine 2.

The job B designates images of two pages. Furthermore, a condition that a sheet is supplied for the $999^{th}$ page of job B is set as the specific condition. As a result, in step S6, it is determined that all of the two sheets output from the image forming section 10 by the execution of job B do not satisfy the specific condition. Therefore, after the execution of the job B, the two printed sheets are stacked in the first post-processing machine 2. That is, after the execution of the jobs A and B, 50 printed sheets are stacked in the first post-processing machine 2.

The controller 14 executes steps S1 to S9 illustrated in FIG. 5 for the job C. Since the job C designates images of two pages and the layout printing is not set, steps S1 to S9 are executed twice. Furthermore, a condition that a sheet is supplied for the second page of job C is set as the specific condition. The sheet output from the image forming section 10 by executing steps S1 to S2 for the first time is supplied for the first page. Therefore, in step S6 performed for the first time, it is determined that the specific condition is not satisfied, and the sheet on which the image of the first page of the job C is formed is stacked in the first post-processing machine 2.

The sheet output from the image forming section 10 by executing steps S1 to S2 for job C for the second time is supplied for the second page. Therefore, in step S6 performed for the second time, it is determined that the specific condition is satisfied, and in step S8, an execution instruction for the first post-processing is output to the first post-processing machine 2. Thus, a sheet bundle including the stacked sheets (i.e., the 50 sheets printed by the execution of the jobs A and B and the sheet on which the image of the first page of the job C has been formed) and the sheet on which the image of the second page of the job C has been formed (i.e., the target sheet that satisfies the specific condition) is banded.

As described above, according to the fourth processing example, the first post-processing may be executed on a plurality of sheets output in accordance with a plurality of jobs.

Fifth Processing Example

Figure 11:
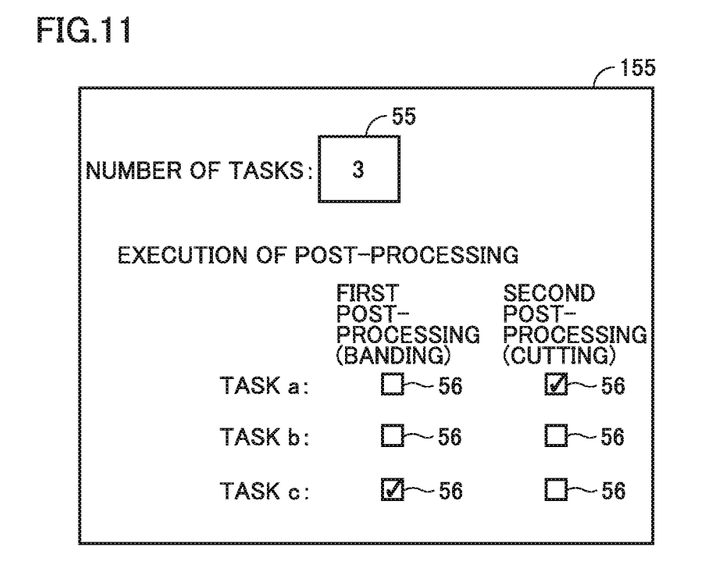
FIG. 11 is a diagram illustrating another example of the setting screen used for setting of a job that is a target for the first post-processing and setting of specific conditions.
Figure 12:
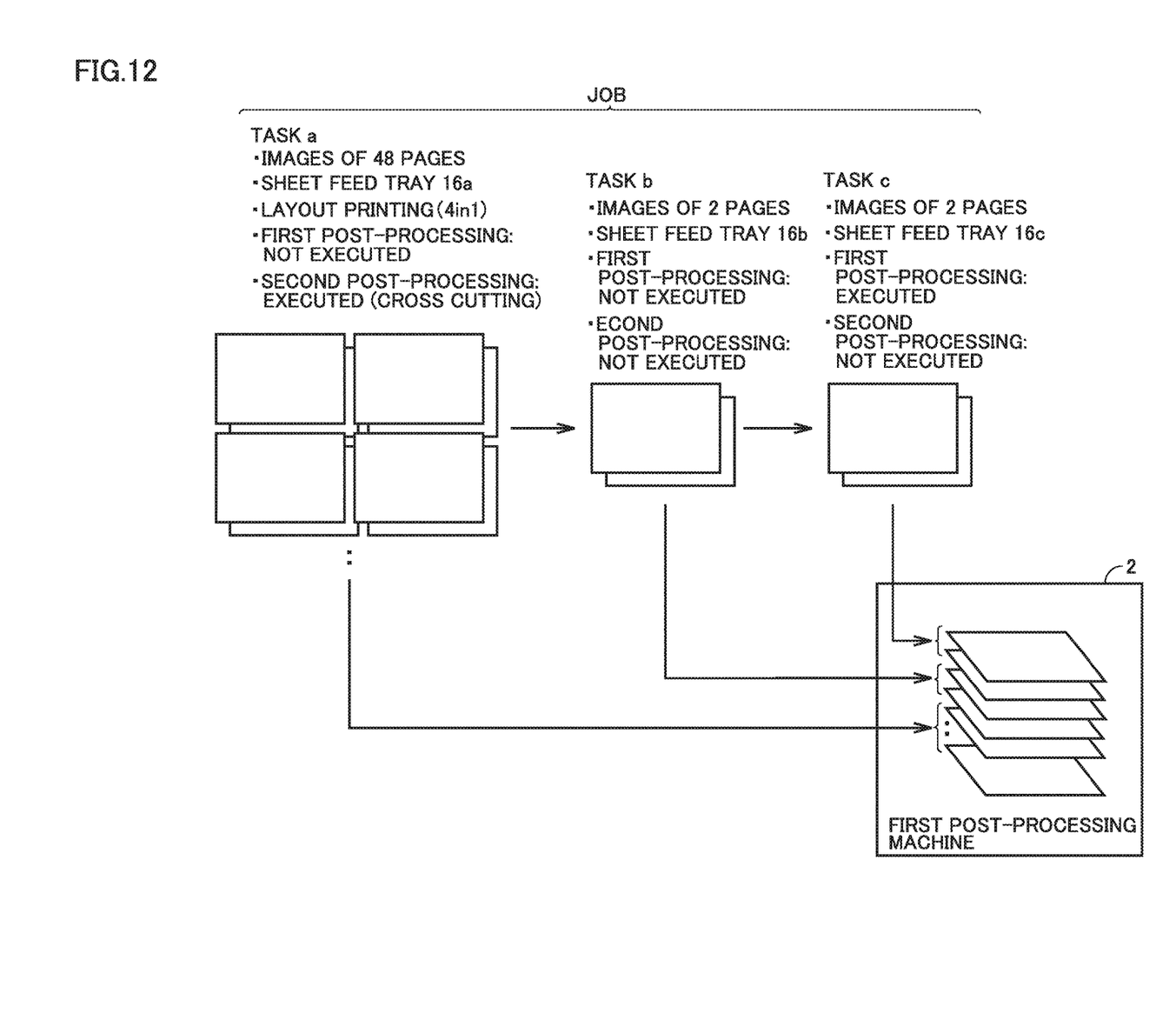
FIG. 12 is a diagram illustrating a fifth processing example of the image forming system.

With reference to FIGS. 11 and 12, a specific fifth processing example of the image forming system 100 according to one or more embodiments will be described.

FIG. 11 is a diagram illustrating another example of the setting screen used for setting of a job that is a target for the first post-processing and setting the specific condition. In the fifth processing example, the controller 14 generates a setting screen 155 shown in FIG. 11 instead of FIGS. 3, 4, and 8, and causes the operation panel 15 to display the setting screen.

The controller 14 is capable of receiving a job including a plurality of tasks. Combinations of whether to execute the post-processing in the plurality of tasks may be different from each other. The plurality of tasks are executed in a designated order. The controller 14 receives a job including a plurality of tasks by using the setting screen 155 illustrated in FIG. 11. The setting screen 155 includes an input field 55 for setting the number of tasks included in a job. Furthermore, the setting screen 155 includes a checkbox 56 for setting post-processing to be executed for each of the tasks corresponding in number to the tasks input in the input field 55. The setting screen 155 displays the tasks of the number Input in the input field 55 in the order of execution. In the example illustrated in FIG. 11, tasks a to c are executed in this order.

In response to the input to the setting screen 155, the controller 14 determines whether the corresponding job is a target for the first post-processing, and sets the specific condition.

Specifically, the controller 14 determines a job including at least one task for which the checkbox 56 corresponding to the first post-processing is checked as a target for the first post-processing. The controller 14 determines a job not including the task for which the checkbox 56 corresponding to the first post-processing is checked as a non-target for the first post-processing. In the case of the setting screen 155 shown in FIG. 11, since the checkbox 56 corresponding to the first post-processing of the task c is checked, the job including the tasks a to c is determined as the target for the first post-processing.

The controller 14 sets, as the specific condition, a condition that an image of the final page of the task for which the checkbox 56 corresponding to the first post-processing is checked is formed on a sheet for the job that is a target for the first post-processing. In the case of the setting screen 155 shown in FIG. 11, a condition that an image of the final page of the task c is formed on a sheet is set as the specific condition.

The controller 14 may display a window for setting a detailed condition of each task on the operation panel 15 and set the detailed condition of the task in accordance with an input to the window.

FIG. 12 is a diagram illustrating a fifth processing example of the image forming system. FIG. 12 illustrates a processing example for a job including tasks a to c corresponding to the setting screen 155 illustrated in FIG. 11. That is, the task a executes the second post-processing and does not execute the first post-processing. The task b does not execute the first post-processing and the second post-processing. The task c executes the first post-processing and does not execute the second post-processing. The task a designates images of 48 pages, sheet feed tray 16a, layout printing (printing for laying out four pages on one sheet), and a condition of the second post-processing (dividing into four in a cross shape (cross cutting)). The task b designates images of two pages and sheet feed tray 16b. The task c designates images of two pages and sheet feed tray 16c. Further, as described above, in accordance with the setting screen 155 illustrated in FIG. 11, the job is determined as the target for the first post-processing, and the condition that the image of the final page of the task c is formed on the sheet is set as the specific condition.

The controller 14 executes steps S1 to S9 illustrated in FIG. 5 for the job including the tasks a to c. The tasks a to c are executed in this order.

The task a designates images of 48 pages and designates layout printing (printing for laying out 4 pages on one sheet). Therefore, the controller 14 repeatedly executes steps S1 to S8 12 times. Since the condition that an image of the final page of the task c is formed on a sheet is set as the specific condition, it is determined in step S6 that not all of the 12 sheets output from the image forming section 10 by the execution of the task a satisfy the specific condition. Therefore, as a result of the execution of the task a, 48 printed sheets are stacked in the first post-processing machine 2.

The task b designates images of two pages and does not designate the layout printing. Therefore, the controller 14 repeatedly executes steps S1 to S8 twice. Since the condition that an image of the final page of the task c is formed on a sheet is set as the specific condition, it is determined in step S6 that not all of the two sheets output from the image forming section 10 by execution of the task b satisfy the specific condition. Therefore, as a result of the execution of the task b, two printed sheets are stacked in the first post-processing machine 2. That is, after the execution of the tasks a and b, 50 printed sheets are stacked in the first post-processing machine 2.

The task c designates images of two pages and does not designate the layout printing. Therefore, the controller 14 repeatedly executes steps S1 to S8 twice. A condition that an image of the final page of the task c is formed on a sheet is set as the specific condition. Therefore, in step S6 performed for the first time, it is determined that the specific condition is not satisfied, and the sheet on which the image of the first page of the task c is formed is stacked in the first post-processing machine 2.

The sheet output from the image forming section 10 by executing steps S1 to S2 of the task c for the second time is supplied for the final page. Therefore, in step S6 performed for the second time, it is determined that the specific condition is satisfied, and in step S8, an execution instruction for the first post-processing is output to the first post-processing machine 2. Thus, a sheet bundle including the stacked sheets (i.e., the 50 sheets printed by the execution of the tasks a and b and the sheet on which the image of the first page of the task c is formed) and the sheet on which the image of the second page of the task c is formed (i.e., the target sheet that satisfies the specific condition) is banded.

As described above, according to the fifth processing example, the first post-processing operation may be executed on a plurality of sheets including a sheet on which the second post-processing operation has been executed by the second post-processing machine 3 and a sheet on which the second post-processing operation has not been executed by the second post-processing machine 3.

Modification Example

The specific condition is not limited to the above examples. For example, the specific condition may include at least one of a condition that a sheet is a predetermined type sheet, a condition that a sheet has a predetermined size, or a condition that a sheet has a predetermined basis weight. When the specific condition includes these conditions, the controller 14 may determine whether a sheet output from the image forming section 10 satisfies the specific condition based on a detection result from the sensor unit 17.

In the above description, the determination as to whether a sheet output from the image forming section 10 satisfies the specific condition is executed by the controller 14 of the image forming apparatus 1. However, the determination may be executed by the controller 21 of the first post-processing machine 2. In this case, the controller 14 of the image forming apparatus 1 outputs, to the controller 21, information about the sheet fed to the image forming section 10 (information indicating a sheet feed tray, a sheet type, a size, a basis weight, and the like). The controller 21 may determine, based on the information received from the controller 14, whether the sheet output from the image forming section 10 satisfies the specific condition. Then, the controller 21 may determine, based on a result of the determination, whether to stack the sheet or to execute the first post-processing.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus connected to a first post-processing machine that executes first post-processing on at least one of a plurality of sheets, the image forming apparatus comprising:
    an image forming device that forms an image on each of the sheets based on each of a plurality of jobs; and
    a hardware processor that:
        receives a setting as to whether each of the jobs is a target for the first post-processing,
        executes a series of jobs that are each set as the target, wherein the executing of the series of jobs comprises:
            determining whether a target sheet of each of the series of jobs satisfies a specific condition,
            in response to determining that the target sheet does not satisfy the specific condition, instructing the first post-processing machine to stack the target sheet, and
            in response to determining that the target sheet satisfies the specific condition, instructing the first post-processing machine to execute the first post-processing on the target sheet and a stacked sheet among the sheets.

2. The image forming apparatus according to claim 1, further comprising:
    a sheet feeder that comprises a plurality of sheet feed trays, wherein
    the specific condition is that the target sheet is fed from a predetermined sheet feed tray among the sheet feed trays.

3. The image forming apparatus according to claim 1, wherein
    the specific condition is at least one of:
        that the target sheet is a predetermined type sheet;
        that the target sheet has a predetermined size; and
        that the target sheet has a predetermined basis weight.

4. The image forming apparatus according to claim 1, wherein
    the specific condition is that the target sheet is supplied for one of the series of jobs.

5. The image forming apparatus according to claim 1, wherein
    the hardware processor receives, for one of the series of jobs, a setting of a designated page on which the first post-processing is to be executed, and
    the specific condition is that the target sheet is supplied for the designated page of the one of the series of jobs.

6. The image forming apparatus according to claim 1, wherein
    in response to receiving a job to output the target sheet and a sheet that does not satisfy the specific condition among the sheets, the hardware processor instructs the first post-processing machine to stack the sheet that does not satisfy the specific condition.

7. The image forming apparatus according to claim 1, further comprising:
    a second post-processing machine that is disposed between the image forming apparatus and the first post-processing machine and executes second post-processing on a sheet output from the image forming device, wherein
    the hardware processor receives a job that has:
        a first task including execution of the second post-processing, and
        a second task including execution of the first post-processing,
    the specific condition is that an image of a final page of the second task is formed on the target sheet, and
    the hardware processor instructs the first post-processing machine to stack, among the sheets:
        a sheet that is a result of the first task, and
        a sheet other than the target sheet on which the image of the final page is formed in the second task.

8. The image forming apparatus according to claim 7, wherein
    the job further includes a third task that does not include the execution of the first post-processing and the second post-processing;
    the hardware processor instructs the first post-processing machine to stack, among the sheets, a sheet that is a result of the third task.

9. An image forming system comprising:
    an image forming device that forms an image on each of a plurality of sheets based on each of a plurality of jobs;
    a post-processing machine that executes post-processing on at least one of the sheets output from the image forming device;
    a hardware processor that:
        receives a setting as to whether each of the jobs is a target for the first post-processing,
        executes a series of jobs that are each set as the target, wherein the executing of the series of jobs comprises:
            determining whether a target sheet of each of the series of jobs satisfies a specific condition,
            in response to determining that the target sheet does not satisfy the specific condition, instructing the first post-processing machine to stack the target sheet, and
            in response to determining that the target sheet satisfies the specific condition, instructing the post-processing machine to execute first post-processing on the target sheet and a stacked sheet among the sheets.

10. A method of controlling an image forming system including an image forming device that forms an image on each of a plurality of sheets based on each of a plurality of jobs and a post-processing machine that executes post-processing on at least one of the sheets output from the image forming device, the method comprising:
    receiving a setting as to whether each of the jobs is a target for the first post-processing; and
    executing a series of jobs that are each set as the target, comprising:
        determining whether a target sheet of each of the series of jobs satisfies a specific condition;
        in response to determining that the target sheet does not satisfy the specific condition, instructing the first post-processing machine to stack the target sheet; and
        in response to determining that the target sheet satisfies the specific condition, instructing the post-processing machine to execute the post-processing on the target sheet and a stacked sheet among the sheets.

* * * * *